July 19, 1932.  I. COWLES  1,867,613
FORCE FEED LUBRICATING SYSTEM, ETC
Filed Aug. 27, 1926  3 Sheets-Sheet 2
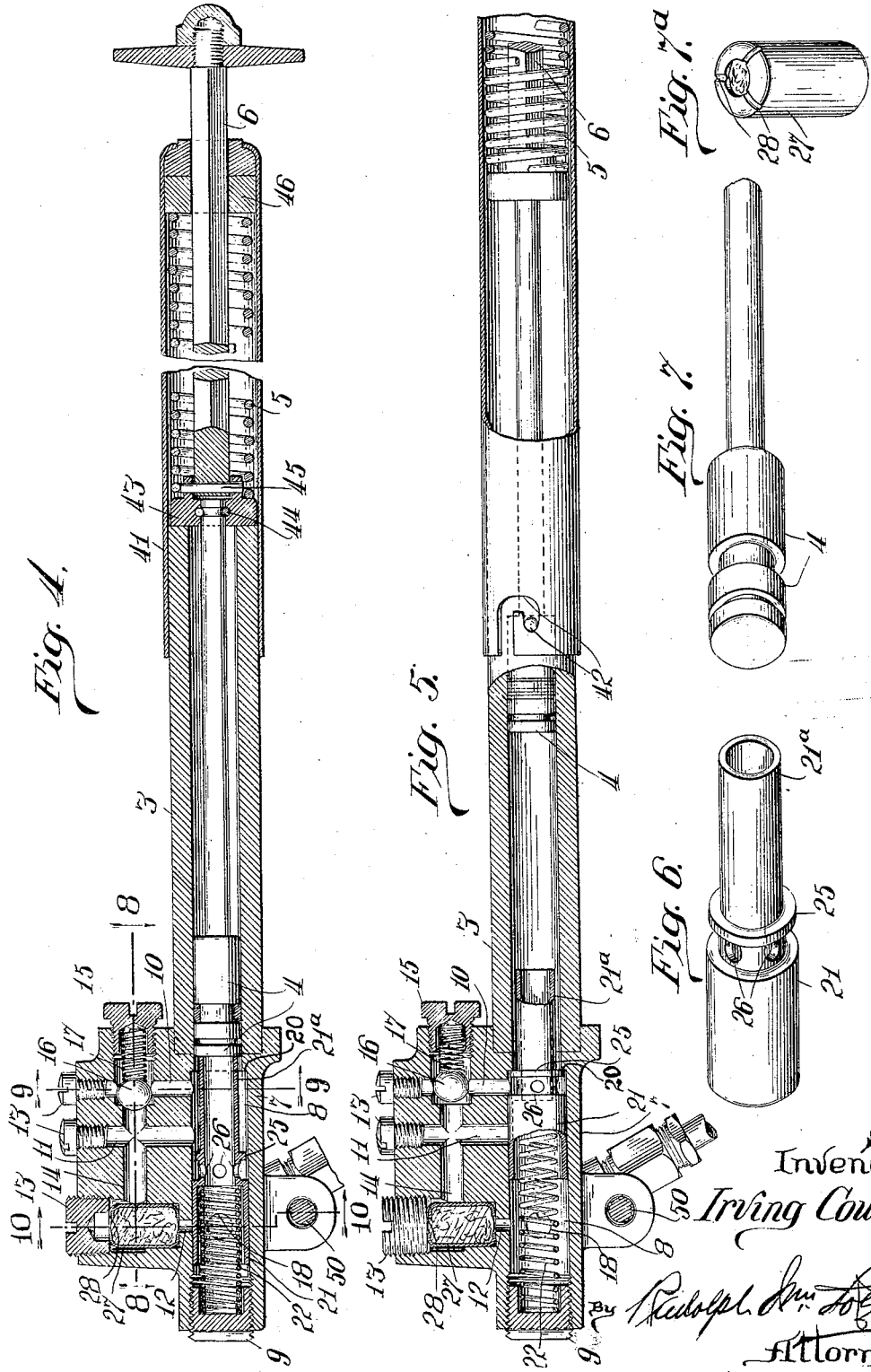

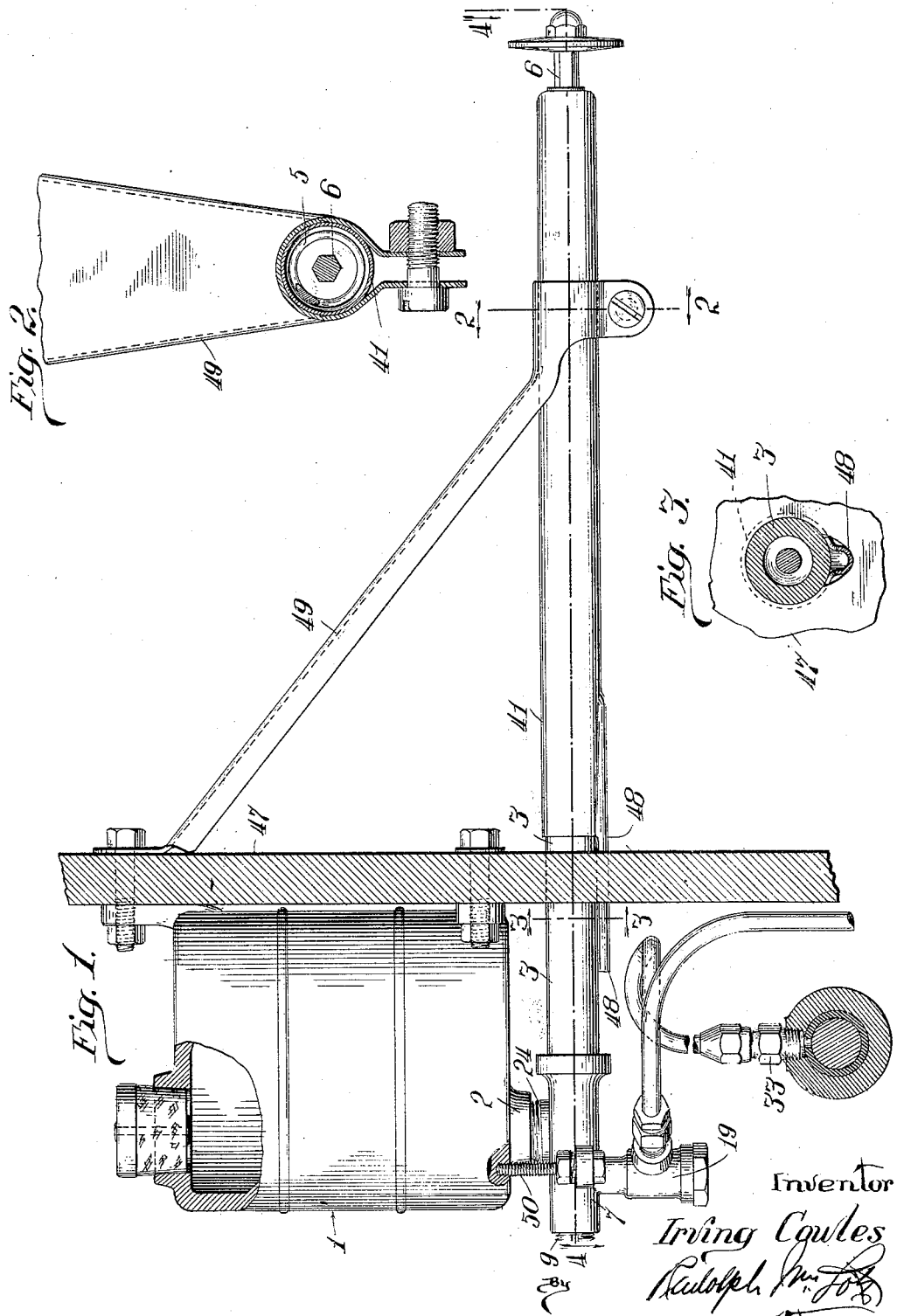

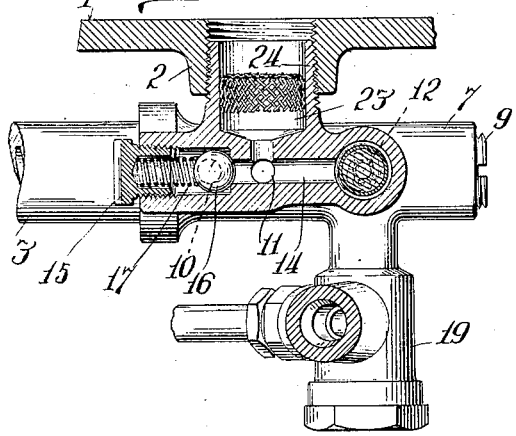
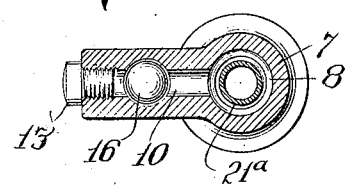
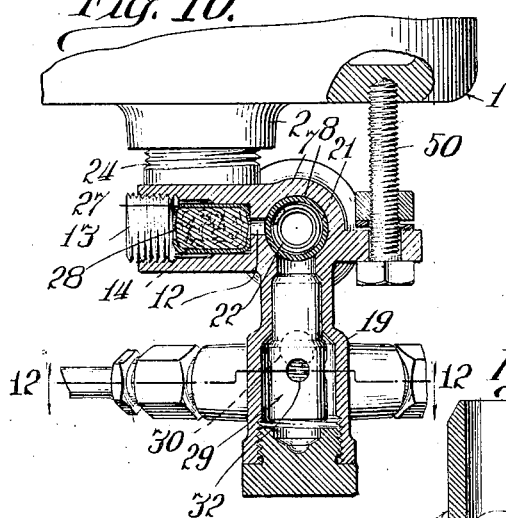
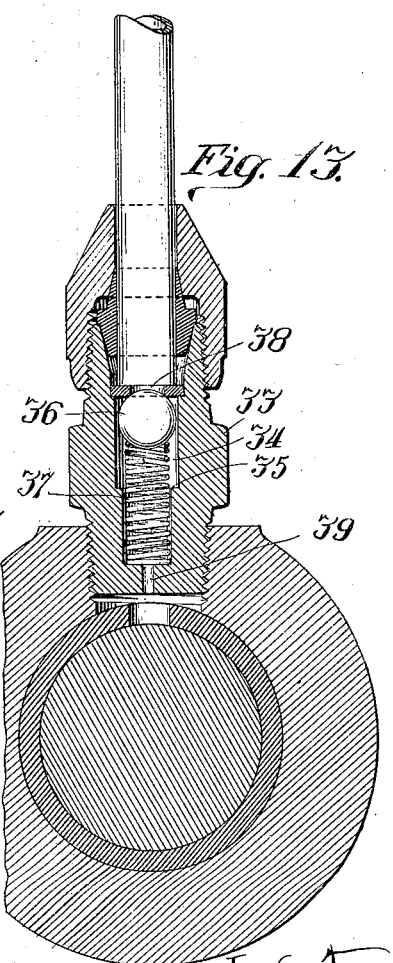
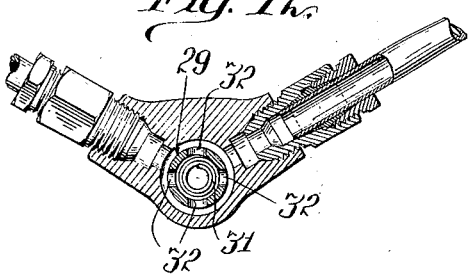
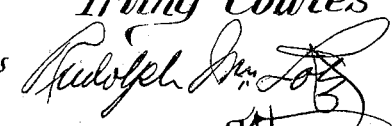

Patented July 19, 1932

1,867,613

UNITED STATES PATENT OFFICE

IRVING COWLES, OF CHICAGO, ILLINOIS, ASSIGNOR TO UNION BANK OF CHICAGO, OF CHICAGO, ILLINOIS, A CORPORATION OF ILLINOIS, AS TRUSTEE

FORCE FEED LUBRICATING SYSTEM, ETC.

Application filed August 27, 1926. Serial No. 131,843.

This invention relates to improvements in force-feed lubricating systems for feeding lubricant under pressure to a number of bearings from a pump, and relates more particularly to that type of lubricating system wherein each bearing receives a predetermined volume of lubricant at each pump operation, the volume fed to the respective bearings being determined by the respective metering devices associated with the said bearings.

The present invention relates more particularly to the pump for effecting forced distribution of the lubricant to the bearings and has for its main objects to provide a pump having the usual check-valve controlled intake and discharge ports, but wherein the valve controlling the discharge port is so arranged as to permit a very limited back-flow of liquid from the pipe lines upon release of pump-pressure for effecting a quick drop in pressure in the pipe lines without, however, permitting more than the very limited back-flow above mentioned. A further object of the invention is to provide a pump which will effect a sudden discharge of liquid into the pipe line to effect quick building of high pressure in said line; which will maintain the said high pressure for an appreciable time-interval, in order to assure flow to the farthest removed bearing in the system, and which, in co-operation with the check-valve in the discharge port, effect a sudden drop of pressure in both pump and pipe-line at the conclusion of the interval of pressure maintenance.

To make clear this last-mentioned object of the invention, it is necessary that it be understood that the several metering devices for the respective bearings effect a shut-off of flow to the bearings as soon as the latter have received the substantially predetermined volumes of lubricant (except as hereinafter pointed out with repect to tight or "frozen" bearings). This shut-off is effected by spring-held valves in the metering devices which are maintained seated against the action of their respective springs so long as the pump pressure is maintained, or the pressure in the pipe-line is maintained, as by seating of the check-valve controlling the discharge port of the pump. The maintenance of this pressure for an appreciable time-interval is very advantageous, in order that the same may be as great at the point farthest removed from the point as at points adjacent the same and, further, in order that all tight or "frozen" bearings in the system may be flooded with oil during the high pressure interval, the presence of one or more tight or "frozen" bearings rendering the metering devices employed incapable of performing their normal shut-off function, to thereby automatically effect the said flooding of such bearings without similarly flooding the remaining bearings of the system.

The invention as applied, for example, to an automotive vehicle for lubricating the chassis bearings, is illustrated in the accompanying drawings, wherein:

Fig. 1 is a view, partly in section, showing the tank and pump mounted on the dashboard of a vehicle.

Figs. 2 and 3 are detail sections on the lines 2—2 and 3—3, respectively, of Fig. 1.

Figs. 4 and 5 are longitudinal sections of the pump on the line 4—4 of Fig. 1, showing the pump-plunger and slide valve in respectively different positions.

Fig. 6 is a perspective view of the slide valve of the pump.

Fig. 7 is a perspective view of the pump plunger.

Fig. 7a is a perspective view of a filter plug of the pump.

Fig. 8 is a fragmentary detail section on the line 8—8 of Fig. 4.

Fig. 9 is a section on the line 9—9 of Fig. 4.

Fig. 10 is a section on the line 10—10 of Fig. 4.

Fig. 11 is a central longitudinal section of the check-valve controlling the discharge port of the pump.

Fig. 12 is a section on the line 12—12 of Fig. 10.

Fig. 13 is a detail section showing a bearing and a metering device associated therewith.

While the invention is here illustrated as applied to an automotive vehicle, it will be understood, of course, that this application is merely exemplary of an installation for feeding a number of bearings of any sort of machine or machines.

The invention contemplates supplying the bearings with lubricant at needed intervals which, in the case of automotive vehicles, will necessarily vary with the variations in travel.

To this end I preferably provide a tank 1, of any convenient size and shape, to contain a supply of lubricating oil and having an outlet 2 in its bottom to which the suction end of the pump 3 is connected.

The pump 3 comprises the usual barrel in which the piston 4 reciprocates, the latter being of any desired suitable construction and being, preferably, spring-actuated for pressure discharge by means of the spring 5 associated with the piston-rod 6 externally of the barrel 3.

Secured to the discharge end of the pump-barrel 3 is the valve-housing 7 having a main bore 8 co-axial and communicating at one end directly with the barrel 3, the other end of said bore being closed by plug 9.

Communicating with the bore 8 between its ends are three lateral passages 10, 11 and 12, respectively, all of which are closed at their outer ends by means of screw-plugs 13 and which are connected with each other between their ends by the bore 14 extending parallel with the bore 8. This bore 14 is closed at one end by the screw-plug 15.

The point of communication of the bore 14 with the bore or passage 10 is controlled by the check-valve 16 held to its seat by means of the spring 17 engaged at one end with the plug 15, this valve 16 being the suction check-valve of the pump. The discharge port 18 for the latter communicates with the valve-casing 19 (Figs. 8 and 10) integral with and projecting from the casing 7 perpendicularly to the passages 10, 11 and 12 and the bore 8. The latter is of slightly larger diameter than the bore of barrel 3 and is provided, adjacent its point of communication with the latter, with an annular stop-shoulder 20 for limiting the movement of the slide valve 21 in response to the pressure of the spring 22.

The passage 14 communicates between its ends with the intake port 23 bordered by the threaded boss 24 connecting into the outlet port of the tank 1, this port being substantially aligned with the passage 11 and extending perpendicularly to the latter (Fig. 8).

The slide valve 21 is hollow to permit flow of liquid through the same and has a small end portion 21a to fit the bore of barrel 3. The flange 25 between the ends of said valve is adapted to engage the stop shoulder 20. Between said flange 25 and the main portion of said valve, there are lateral openings 26 for flow of oil during the suction stroke of the piston 4 and while the flange 25 engages the shoulder 20.

The passage or duct 12 is annularly enlarged at its outer end portion to provide for the reception of a sleeve 27 filled with a suitable filtering material. This sleeve snugly fits the portion of the passage or bore 12 which lies between its inner and outer end portions so that no oil may readily leak past the said sleeve. The outer end portion of said passage 12 is of considerably greater diameter than the said sleeve 27. The ends of the latter are inturned to hold the filtering material in place and the inturned end opposing the plug 13 of said passage 12 is provided with radial grooves 28 (Fig. 7a) to permit passage of oil forced through the filtering material from the bore 8.

In the valve-casing 19, which is of larger diameter at its outer than at its inner end, there is mounted a reciprocable check-valve 29 which snugly fits the smaller bore portion of said casing and is capable of only a very limited longitudinal movement. The said valve is hollow and is provided between its ends with a seat for the check-valve 30 held by compression spring 31 carried by the valve 29. This valve permits resisted flow of liquid from the casing 7 through the valve 29 and lateral openings 32 into the annular space around the outer end portion of valve 29. This space connects with one or more pipes leading to the several metering devices 33 (Fig. 13) associated with the bearings. It will be particularly noted that the valve 29 is not spring-held to its seat.

Each of the metering devices comprises a small casing provided with a stepped axial bore 34 provided between its ends with a valve seat 35 for the ball-valve 36 which is held by spring 37 normally seated upon the intake port 38 of the casing 33. The valve 36 is of considerably smaller diameter than the portion of the bore between the valve seat 35 and port 38 so that oil may pass said valve by leakage. The area of the annular space allowed for such leakage is considerably less than that of the discharge port 39 of the casing 33. The latter is adapted to be threaded into the bearing 40 to be supplied therefrom.

It will be noted that a cylindrical housing 41 is removably associated with the barrel 3 by means of the bayonet joint 42, said housing covering the spring 5 which serves also to retain said housing engaged with the pump-barrel. Said spring bears at one end on the outer end wall of said housing 41 and at its other end on the collar 43 of the piston-rod to normally hold the piston at the inner limit of its movement.

While the details of construction concerning the manner of mounting the collar 43 on the piston-rod is of no moment here, attention is, nevertheless, directed to the fact that for purpose of low cost of manufacture and assembly, involving the absence of screw-threads to the greatest possible extent, the said collar is held in place by means of the split collar 44 and the key pin 45, said collar 43 serving to couple the two portions of the piston-rod. The key pin 45 is held against removal by the spring 5. The outer end portion of the piston-rod is preferably square and passes through an oil soaked block 46 of wood disposed in the outer end portion of the casing.

In all pumps oil will find its way past the piston. Such oil, in this instance, will find its way into the tube or casing 41 which is substantially horizontally disposed rearwardly of the dashboard 47 of the vehicle to which the tank 1 is secured. Oil in the casing 41 would, unless other provision is made, leak out upon the floor of the car and, to prevent this, I provide a drain opening in the casing 41 just beyond the outer end of pump-barrel 3. This oil is caught by the small trough 48, which extends through the dashboard, and drips from the end thereof upon the ground.

A brace 49 of ordinary construction is provided to support the casing 41 and to prevent any rotary movement of the pump about the axis of the discharge port 2 of tank 1, I provide an anchor bolt 50 and lock-nuts for the casing 7 and tank 1, as shown in Fig. 1.

The operation of the device is as follows:

The piston 4 and slide valve 21 are normally in the position shown in Fig. 4. In this position the slide valve closes the port or passage 12 and the discharge port 18, the ports 10 and 11 being open.

The tank 1 now communicates directly with the bore 8 of casing 7 so that during the initial suction stroke of the piston 4 against the action of the spring 5, an unresisted flow of oil from the tank ensues. But as the slide valve 21 follows the piston 4 under the influence of the spring 22, it closes port 11 and opens ports 12 and 18 without, however, causing or permitting any flow from these ports into bore 8. But closure of port 11 necessitates flow of the incoming oil through port 10 and past check-valve 16, said port 11 remaining open from the time the suction stroke of the piston begins until it ends. Said suction stroke continues after slide valve 21 engages the stop-shoulder 20 and said slide-valve retains this position until the piston 4 approaches the end of its pressure stroke.

As soon as the suction stroke of the piston 4 is completed, the operator releases the piston rod so that the spring 5 may impart the pressure stroke. This is necessarily as rapid as resistance to flow from the pump permits, the maximum pump pressure being attained under conditions only of maximum resistance to discharge.

Assuming for purposes of a clear understanding that twenty bearings are to be supplied from the pump; that each bearing is equipped with a metering device 33 and that each of said devices is of a size, to deliver approximately five drops of oil to its bearing upon each pressure stroke of the pump. Thus, at each such stroke approximately one hundred drops of oil must be delivered. But the pump capacity, we will assume to be two hundred drops, so that, after supplying all of the bearings there remain one hundred drops surplusage to be disposed of.

In practice the pump piston and spring are co-related to develop a maximum pressure of two hundred lbs. per sq. in. in the pipe-lines. The springs and valves of the metering devices are co-related to permit said valves to seat under the influence of the velocity derived from approximately thirty lbs. per sq. in. pressure. Hence, the initial pipe-line pressure developed during the initial pressure stroke of the piston cannot greatly exceed thirty lbs. and it is at approximately this pressure at which the oil in the casings 33 between the valves therein and the discharge ports thereof (or more properly that proportion of the entire content of each casing 33 lying between the intake port and the valve seat 35) is delivered to the several bearings, if the latter are normal as distinguished from tight or "frozen" bearings.

Under the aforesaid conditions, the piston 4 will have completed only approximately one-half its stroke when flow to the bearings is completely shut off.

At this time the slide valve is still in the position shown in Fig. 5. The port 11, being closed by the slide valve, will not permit oil to pass back into the tank therethrough, nor can the oil flow back through the port 10. As there is no further escape through port 18, the oil must find its way back to the tank through the filter plug in port or passage 12. This permits a very gradual return of the surplus oil to the tank and causes the pressure in the pipe line to attain and maintain the pressure of two hundred lbs. per sq. in. for a very appreciable period. Obviously, this is ordinarily of no importance, but becomes very important under conditions hereinafter pointed out.

Under the normal conditions aforesaid, the piston very gradually completes the pressure stroke and near the conclusion thereof moves the slide valve back to the position shown in Fig. 4. As soon as said slide valve has partly opened the port 11, free flow of oil to the tank 1 takes place and this instantly relieves the pump pressure and causes a very rapid final movement of the piston to the end of its pressure stroke. As the slide valve reaches its normal position, it closes the ports 12 and 18 and thus prevents backflow of oil from the pipe line into the casing 7.

It will be obvious that if, upon relief of pump pressure, the pipe line pressure remains by reason of closure of the check-valve controlling the discharge port 18, the valves of the metering devices 33 would be held permanently upon their seats. This condition is avoided by the particular construction shown in Fig. 10, the check-valve 29 being vertically disposed and moved downwardly under the influence of flow from the port 18 before the check-valve 30 within the valve 29 opens. The valve 29 retains this position so long as the pump-pressure is maintained at a high point, but at the instant that the slide valve 21 passes the port 11 to permit sudden relief of pump-pressure and before said valve 21 closes the discharge port 18, the pipe-line pressure, or the pressure induced therein by the constant tendency of the springs in the metering devices to return the valves thereof to normal position, causes the valve 29 to move toward its seat and this very limited movement is sufficient to relieve the pipe-line pressure to substantially zero and thus permit the valves in the metering devices to return to their normal spring-held positions. If the check-valve 29 should drop to its lowest position between pump operations, the result will be the same as above described, but such dropping could hardly occur, unless there were a leak in the piping.

But since no back-flow of oil from the pipe lines (beyond the few drops returned into the casing 19 to throw the check-valve 29 to its seat) into the pump can occur, it will be obvious that the valves in the metering devices 33 will return to their seats through the oil contained in the casings of said devices and without discharging any of that oil. This effects transfer of the oil above the valves seated on the seats 35 to below said valves as the latter attain their normal positions.

The devices 33 may be disposed to discharge the oil in any direction, that is, upwardly, downwardly, or at any angle between the vertices with equal efficiency, as demonstrated in practice.

If among the bearings fed from the pump there be one or more that are very tight or are "frozen" the operation is automatically modified to the following extent.

I have hereinabove pointed out that the movements of the valves contained in the metering devices to their seats is effected by velocity of flow of the entering oil. It will be very obvious that velocity of flow into the casings 33 can be no greater than the discharge velocity from the latter. If the discharge velocity is retarded by resistance due to tight or "frozen" bearings, then, a back-pressure between the valve and the discharge end of the casing 33 is instantly built up and prevents the valve in the casing associated with a tight or "frozen" bearing from moving to seat 35 and thus a direct communication between the pipe-line and that particular tight or "frozen" bearing is established, so that said bearing is fed under substantially maximum pipe-line pressure for forcing oil into the same so long as said high pressure continues. Such a bearing or bearings will thus receive whatever amount of the surplus oil in the pump in excess of what returns to the tank 1 through the filter plug and this ordinarily effects a flooding of such bearing or bearings. This is, obviously, very desirable.

In practice it is found that upon the release of the piston-rod by the operator, the indicating hand of a pressure gauge associated with the pipe-line, jumps instantly to the graduation indicating two hundred lbs. pressure and remains at this point for a very appreciable period (about two minutes) as the piston very gradually approaches the limit of its pressure stroke. As it reaches a given point (at which the slide valve uncovers port 11) the indicating hand returns instantly to the zero graduation.

It will be particularly noted that the construction illustrated and described is very simple and can be manufactured at very low cost and is also easily assembled and installed.

I claim as my invention:

1. A pump including a pump-barrel, a reciprocable piston therein, a valve casing associated with the pump-barrel and having an intake port, and a plurality of discharge ports, two of the latter communicating with the source of supply of fluid associated with the intake port and another thereof communicating with piping for distribution of fluid under pressure, means associated with said piping for limiting discharge from the latter, a spring-held slide-valve controlling all of said ports and associated with the piston for actuation by the latter, said valve normally held against the action of its spring to maintain the last-mentioned discharge port and one of the other discharge ports closed and adapted, during the suction stroke of said piston to open said ports and close the remaining discharge port, a spring-held check-valve controlling the intake port, and a check-valve controlling the discharge port leading to the piping.

2. A pump including a pump-barrel, a reciprocable piston therein, a valve-casing associated with said barrel and having a spring-held check-valve controlled intake port communicating at all times with said barrel, piping and means associated therewith for effecting distribution of a part only of fluid discharged from the pump during each complete pressure stroke of its piston, a check-valve controlled discharge port leading from said valve-casing to said piping, pressure relief ports leading from said valve-casing for discharge of surplus fluid not discharged into said piping, a slide-valve in said casing controlling said discharge and relief ports and associated with the piston for movement in the same direction as the latter during parts of its suction and pressure strokes, said slide valve normally positioned to close the discharge port and one of aid relief ports, means within the latter for permitting restricted flow from said casing during a part of the pressure stroke of the piston to thereby maintain a relatively wide pump pressure during said interval, said slide valve arranged to close the other relief port as the restricted port is opened and vice versa.

3. A pump including a pump barrel, a reciprocable piston therein, a valve-casing associated with said barrel and having a spring-held check-valve controlled intake port communicating at all times with said barrel, piping and means associated therewith for effecting distribution of a part only of fluid discharged from the pump during each complete pressure stroke of its piston, a check-valve controlled discharge port leading from said valve-casing to said piping, pressure relief ports leading from said valve-casing for discharge of surplus fluid not discharged into said piping, a slide valve in said casing controlling said discharge and relief ports and associated with the piston for movement in the same direction as the latter during parts of its suction and pressure strokes, said slide valve normally positioned to close the discharge port and one of said relief ports, a filter plug in the latter for permitting restricted flow from said casing during a part of the pressure stroke of the piston to thereby maintain a relatively high pump pressure during said interval, said slide valve arranged to close the other relief port as the restricted port is opened and vice versa.

4. A pump including a pump-barrel, a reciprocable piston therein, a valve-casing associated with said barrel and having a spring-held check-valve controlled intake port communicating at all times with said barrel piping and means associated therewith for effecting distribution of a part only of fluid discharged from the pump during each complete pressure stroke of its piston, a check-valve controlled discharge port leading from said valve casing to said piping, pressure relief ports leading from said valve-casing for discharge of surplus fluid not discharged into said piping, a slide valve in said casing controlling said discharge and relief ports and associated with the piston for movement in the same direction as the latter during parts of its suction and pressure strokes, said slide valve normally positioned to close the discharge port and one of said relief ports, a filter plug in the latter for permitting restricted flow from said casing during a part of the pressure stroke of the piston to thereby maintain a relatively high pump pressure during said interval, said slide valve arranged to close the other relief port as the restricted port is opened and vice versa, and to maintain said discharge port open so long as said restricted relief port is open.

5. A pump including a pump-barrel, a reciprocable piston therein, a valve-casing associated with said barrel and having a spring-held check-valve controlled intake port communicating at all times with said barrel, piping and means associated therewith for effecting distribution of a part only of fluid discharged from the pump during each complete pressure stroke of its piston, a check-valve controlled discharge port leading from said valve-casing to said piping, pressure relief ports leading from said valve-casing for discharge of surplus fluid not discharged into said piping, a slide valve in said casing controlling said discharge and relief ports and associated with the piston for movement in the same direction as the latter during parts of its suction and pressure strokes, said slide valve normally positioned to close the discharge port and one of said relief ports, means within the latter for permitting restricted flow from said casing during a part of the pressure stroke of the piston to thereby maintain a relatively high pump pressure during said interval, said slide valve arranged to close the other relief port as the restricted port is opened and vice versa, said discharge port and said unrestricted relief port being simultaneously open during a part of the pressure stroke of said piston to thereby establish direct communication between said ports, said check-valve for the discharge port being fluid pressure responsive to back pressure in said piping during the interval that said last-named ports are open for effecting return into the valve-casing of a part of the liquid discharged into the piping to thereby relieve the pressure in said piping.

6. In a lubricating system, the combination with piping for feeding a plurality of outlets for fluid under pressure, and means at each outlet for shutting off flow therefrom following discharge of a substantially predetermined volume of said fluid, of a pump discharging into said piping, means interposed between said pump and said piping for effecting limited return flow of fluid from the latter into the former for effecting relief of pressure in said piping following shut-off of flow from said outlets, a piston for said pump, a valve associated therewith for actuation thereby, for effecting timed control of the pressure within said piping, and means associated with said pump and controlled by said valve for effecting discharge of surplus fluid under pressure from said pump between the instant of flow stoppage from said outlets and relief of piping pressure.

7. In a lubricating system, the combination with self-restoring valves disposed at the bearings for shutting off flow to the latter following discharge of a substantially predetermined volume to each thereof, a pump for intermittently forcing lubricant to said valves, and piping associating said pump with said valves, of means interposed between said pump and said piping effecting forced discharge from the pump into the piping and preventing flow from the piping into the pump, said means being fluid pressure responsive to reverse flow of fluid within the piping resulting from self-restoration of said valves upon relief of pump pressure to thereby relieve pressure on said valves tending to prevent self-restoration thereof.

8. In a lubricating system, the combination with self-restoring valves disposed at the bearings for shutting off flow to the latter following discharge of a substantially predetermined volume to each thereof, a pump for intermittently forcing lubricant to said valves, and piping associating said pump with said valves, of a casing interposed between said pump and said piping, a fluid pressure responsive reciprocable member in said casing, a check-valve carried thereby for effecting forced passage of fluid from the pump to the piping after said member has reached one limit of its movement and preventing flow of fluid from the piping to the pump, said self-restoring valves effecting reverse flow of fluid in the piping following relief of pump pressure to thereby restore said member to initial position.

9. In a lubricating system, the combination with self-restoring valves disposed at the bearings for shutting off flow to the latter following discharge of a substantially predetermined volume to each thereof, a pump for intermittently forcing lubricant to said valves, and piping associating said pump with said valves, of a reciprocable plunger pump of a total capacity at each pressure stroke in excess of the total volume to be discharged from the several valves, a flow responsive member interposed between said pump and piping for effecting forced flow from the former to the latter while preventing return flow upon relief of pump pressure, and means for relieving pump pressure during the pressure stroke of said pump, said member being responsive to back-flow of fluid resulting from the self-restoring of said valves to permit such back-flow within the piping while maintaining said fluid trapped against leakage from said piping.

10. In a lubricating system, a reciprocable plunger pump including a spring for imparting the discharge stroke to the plunger, valve casings at the bearings to be lubricated, piping connecting the said casings with the pump, spring-held valves in said casings adapted to be seated against the action of their springs to shut off flow from said casings responsively to each pressure stroke of said pump plunger, a flow responsive member interposed between the pump and the piping for effecting forced passage of fluid into the latter while preventing return flow therefrom to the pump upon relief of pump pressure, said member being actuated by reverse flow in the piping resulting from unseating of said valves to thereby prevent the latter from being permanently held to their seats.

11. In a lubricating system, the combination with piping for feeding a plurality of outlets for fluid under pressure, and means at each outlet for shutting off flow therefrom following discharge of a substantially predetermined volume of said fluid, of a spring-actuated pump discharging into said piping, means interposed between said pump and said piping for effecting limited return flow of fluid from the latter into the former for effecting relief of pressure in said piping following shut-off of flow from said outlets, a piston for said pump, a valve associated therewith for actuation thereby, for effecting timed control of the pressure within said piping, and means associated with said pump and controlled by said valve for effecting discharge of surplus fluid under pressure from said pump between the instant of flow stoppage from said outlets and relief of piping pressure.

12. In a lubricating system, the combination with piping for feeding a plurality of outlets, for fluid under pressure, and spring-held, fluid pressure responsive means at each outlet for automatically shutting off flow therefrom after discharge of a substantially predetermined volume of fluid, of a spring-actuated pump discharging into said piping, and a flow responsive valve member interposed between the pump and piping for preventing back-flow from the latter into the pump while effecting limited reverse flow of fluid within the piping responsively upon relief of pump pressure to thereby relieve piping pressure.

13. In a lubricating system, the combination with piping for feeding a plurality of outlets for fluid under pressure, and spring-held, fluid pressure responsive means at each outlet for automatically shutting off flow therefrom after discharge of a substantially predetermined volume of fluid, of a spring-actuated pump discharging into said piping, and a fluid pressure responsive valve member interposed between the pump and piping for preventing back-flow from the latter into the pump while effecting limited reverse flow of fluid within the piping responsively to reaction of said spring-held means upon relief of pump pressure to thereby relieve piping pressure.

14. In a lubricating system, the combination with piping for feeding a plurality of outlets, for fluid under pressure, and means at each outlet for automatically shutting off flow therefrom after discharge of a substantially predetermined volume of fluid, of a spring-actuated pump of capacity in excess of the total volume of liquid to be discharged from the several outlets at each pressure stroke, said pump connected at its discharge end with said piping, valve mechanism interposed in said connection for preventing back-flow from the latter into the pump while permitting limited reverse flow of fluid upon relief of pump pressure to thereby relieve piping pressure, a pressure relief port for said pump for discharge of surplus fluid under pressure, filtering material in said port for resisting flow therethrough, a second relief port for permitting free discharge from said pump, and a valve controlling said ports for opening the last-named port after discharge of a substantially predetermined volume of fluid through the first-named port, said valve operatively associated with an operative element of said pump.

15. In a lubricating system, the combination with piping for feeding a plurality of outlets, for fluid under pressure, and means at each outlet for automatically shutting off flow therefrom after discharge of a substantially predetermined volume of fluid, of a spring-actuated pump of capacity in excess of the total volume of liquid to be discharged from the several outlets at each pressure stroke, said pump connected at its discharge end with said piping, valve mechanism interposed in said connection for preventing back-flow from the latter into the pump while permitting limited reverse flow of fluid upon relief of pump pressure to thereby relieve piping pressure, means associated with said pump for effecting slow restricted discharge of part of the surplus fluid therein while maintaining sufficient pressure in the piping to maintain said outlets closed during an appreciable time interval, and means for effecting unrestrained discharge of the last remaining portion of surplus fluid in said pump to thereby effect relief of pressure in said pump and piping.

16. In a lubricating system, the combination with piping having a plurality of outlets for fluid under pressure, and spring-held, fluid pressure responsive means at each outlet for shutting off flow therefrom following discharge of a substantially predetermined volume of said fluid, of a pump connected with said piping, a piston in said pump, a spring for imparting the pressure stroke to said piston, means interposed between the pump and piping for preventing fluid delivered into the latter from returning to said pump, while permitting limited back-flow of fluid trapped in the piping when the pump pressure is relieved to effect relief of pressure in the piping without leakage from the latter, a pair of pressure relief ports for said pump, one thereof unrestricted and the other thereof containing filtering material, and a valve associated with the piston and controlling said ports for maintaining the unrestricted port closed and the restricted port open, until the piston attains a predetermined point in its pressure stroke.

17. The combination with self-restoring metering devices associated with points to be lubricated for shutting off flow to said points after substantially predetermined volumes of lubricant have been fed thereto, of a pump for distributing lubricant under pressure to said devices, said pump having a capacity in excess of the aggregate normal requirements of said devices, means associated with said pump for effecting gradual resisted escape of excess lubricant responsively to any range of pressure effected by said pump, and means associated with said pump and said devices for momentarily relieving said devices of pressure to thereby permit of self restoring thereof.

18. The combination with a pump capable of being actuated to discharge liquid therefrom at various pressures, and fluid pressure responsive self restoring fluid measuring devices associated with points to be lubricated and with said pump for shutting off flow from the latter to said points upon delivery to each of the latter of a predetermined volume of lubricant, of means associated with said pump and said devices for discharge of lubricant in excess of the aggregate requirements of said devices after shut off of flow to the bearings at whatever pressure is generated by said pump, and means associated with the pump and said devices for effecting momentary relief of pump pressure during the pressure stroke of the pump plunger for permitting self restoring of said devices.

19. In a lubricating system, the combination with self restoring fluid pressure responsive flow interrupting devices, and a pump capable of being actuated to deliver lubricant to said devices at any selected pressure, of means associated with said pump and said devices for permitting slow discharge from the system of lubricant in excess of the requirements of said devices while maintaining the lubricant under pressure, and under whatever pressure is created by the pump, and means for effecting substantially complete relief of pressure to thereby permit the self restoring of said devices.

20. In a lubricating system, the combination with self-restoring normally fluid pressure responsive devices associated with points to be lubricated for normally shutting off flow to said points after delivery of a predetermined volume of lubricant, a pump for effecting forced flow of lubricant to said devices, said pump capable of actuation for exerting any selected pressure, means associated with the pump for effecting discharge of excess lubricant from the same otherwise than to said devices at any pressure exerted by the pump, and auxiliary means associated with said pump and said devices for effecting substantially complete relief of pressure on said devices to permit self-restoring of the latter.

21. In a lubricating system of substantially the character described, a pump having a piston for effecting forced flow of lubricant to the points to be lubricated during movement in one direction, means for maintaining piping pressure during an appreciable time interval following initial discharge of lubricant to the points to be lubricated, and valve-mechanism associated with the pump for relieving piping pressure before said piston has completed its movement in said direction.

22. In a lubricating system, a source of oil, a pump connected therewith, piping leading from the pump to the bearings, self-restoring devices at the bearings for interrupting flow to the latter before the pump has completed its pressure stroke, means for maintaining piping pressure during an appreciable time interval following initial discharge of lubricant to the points to be lubricated, and valve mechanisms associated with the pump and piping for relieving pressure in the latter before the pump has completed its pressure stroke to thereby permit the self-restoring of said devices.

23. In a lubricating system, a source of oil, a pump connected therewith, piping leading from the pump to the bearings, self restoring devices at the bearings for interrupting flow to the latter before the pump has completed its pressure stroke, an obstructed port for return to the source, of excess oil in the pump following interruption of flow to the bearings, and valve mechanisms, one of which is associated with the pump plunger and the other of which is fluid pressure responsive and associated with the piping for relieving pressure in the latter before the pump has completed its pressure stroke to thereby cause the self-restoring of said devices.

24. In a lubricating system including self restoring valves at the bearings for interrupting flow to the latter, a pump and piping for delivering lubricant under pressure to said valves, a permanently open resistance element for discharge of surplus lubricant from the pump after closure of said valves and during a part of the pressure stroke of the pump and means for effecting complete relief of the pump pressure before the pump has begun its suction stroke.

25. In a lubricating system including self restoring valves at the bearings for interrupting flow to the latter, a pump and piping for delivering lubricant under pressure to said valves, a permanently open resistant element for discharge of surplus lubricant from the pump after closure of said valves and during a part of the pressure stroke of the pump, means for effecting substantially complete relief of the pump pressure before the pump has completed its pressure stroke, and fluid pressure responsive means for effecting relief of piping pressure simultaneously with the relief of pump pressure.

26. In a lubricating system including self restoring valves at the bearings for interrupting forced flow to the latter, a pump and piping for feeding said valves, and means including a valve actuated by the pump plunger effecting relief of piping pressure to permit the self restoring of said valves before the pump has completed its pressure stroke.

27. A lubricating system including self restoring valves associated with the several bearings for interrupting flow to the latter, a single conduit common to all of said valves, means for forcing lubricant to said valves, means for trapping the lubricant in said conduit upon closure of said valves, means for automatically relieving pressure in said forcing means, and means for automatically relieving conduit pressure coincidentally with relief of the forcing pressure while preventing leakage from said conduits.

28. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, of means interposed between said pump and said piping for shutting off reverse flow of lubricant from said piping to said pump, means within the pump for effecting complete relief of pump pressure at a given point in the pressure stroke of the pump piston, and means associated with the first-mentioned means and actuated by piping pressure at the moment of relief of pump pressure for relieving pipe pressure simultaneously therewith to thereby permit spring recovery of said devices.

29. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, of a spring-held check-valve interposed between said pump and said piping for shutting off reverse flow of lubricant from said piping to said pump, means within the pump for effecting complete relief of pump pressure at a given point in the pressure stroke of the pump piston, and means associated with the said check-valve and actuated by piping pressure at the moment of relief of pump pressure for relieving pipe pressure simultaneously therewith to thereby permit spring recovery of said devices.

30. In a lubricating system including spring-held fluid pressure responsive devices at the bearings for automatically shutting off flow to the latter after feeding substantially predetermined volume of fluid to each thereof, piping leading to said devices, and a reciprocable pump piston for feeding lubricant under pressure to said devices, said pump having a discharge capacity in excess of the aggregate requirements of all of said devices, means associated with the pump for receiving surplus lubricant from the latter following interruption of flow into the bearings, of means interposed between said pump and said piping for shutting off reverse flow of lubricant from said piping to said pump, means within the pump for effecting complete relief of pump pressure at a given point in the pressure stroke of the pump piston, and means associated with the first-mentioned means and actuated by piping pressure for relieving pipe pressure simultaneously therewith to thereby permit spring recovery of said devices.

31. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, said pump having a discharge capacity in excess of the aggregate requirements of all of said devices, means associated with the pump for receiving surplus lubricant from the latter following interruption of flow into the bearings, of a spring-held check-valve interposed between said pump and said piping for shutting off reverse flow of lubricant from said piping to said pump, means within the pump for effecting complete relief of pump pressure at a given point in the pressure stroke of the pump piston, and means associated with the said check-valve and actuated by piping pressure for relieving piping pressure simultaneously therewith to thereby permit spring recovery of said devices.

32. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, said pump having a discharge capacity in excess of the aggregate requirements of all of said devices, means associated with the pump for receiving surplus lubricant from the latter following interruption of flow into the bearings while pump and piping pressure is maintained at a point preventing spring recovery of said devices, of a spring-held check-valve interposed between said pump and said piping for shutting off reverse flow of lubricant from said piping to said pump, means within the pump for effecting complete relief of pump pressure at a given point in the pressure stroke of the pump piston, and means associated with the said check-valve and actuated by piping pressure at the moment of relief of pump pressure for relieving piping pressure simultaneously therewith to thereby permit spring recovery of said devices.

33. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, said pump having a discharge capacity in excess of the aggregate requirements of all of said devices, and having its piston spring actuated on its pressure stroke, means associated with the pump for receiving surplus lubricant from the latter following interruption of flow into the bearings, of means interposed between said pump and said piping for shutting off reverse flow of lubricant from said piping to said pump, means within the pump for effecting complete relief of pump pressure at a given point in the pressure stroke of the pump piston, and means associated with the first-mentioned means and actuated by piping pressure for relieving piping pressure simultaneously therewith to thereby permit spring recovery of said devices.

34. In a lubricating system including spring-held fluid pressure responsive devices at the bearings for automatically shutting off flow to the latter after feeding substantially predetermined volume of fluid to each thereof, piping leading to said devices, and a reciprocable piston pump for feeding lubricant under pressure to said devices, said pump having a discharge capacity in excess of the aggregate requirements of all of said devices, and having its piston spring actuated on its pressure stroke, of a spring-held check-valve interposed between said pump and said piping for shutting off reverse flow of lubricant from said piping to said pump, means within the pump for effecting complete relief of pump pressure at a given point in the pressure stroke of the pump piston, and means associated with the said check-valve and actuated by piping pressure for relieving piping pressure simultaneously therewith to thereby permit spring recovery of said devices.

35. In a force feed lubricating system of the type specified, a pump barrel, piping connecting the latter with discharge points for lubricant, spring-held pressure responsive means at said points for interrupting discharge of said lubricant, a reciprocable piston in said barrel, a pressure relief port in said barrel, a discharge port leading to said piping, a spring-held valve associated with both said ports and operatively associated with said piston for actuations by the latter during its pressure stroke to connect said discharge port with said relief port during a time interval in the pressure stroke of said piston and before the latter has attained the end of said pressure stroke to thereby effect relief of pump and piping pressure during said time interval.

36. In a force feed lubricating system of the type specified, a pump barrel, piping connecting the latter with discharge points for lubricant, spring-held pressure responsive means at said points for interrupting discharge of said lubricant, a reciprocable piston in said barrel, a pressure relief port in said barrel, a discharge port leading to said piping, a spring-held slide valve in the pump barrel provided between its ends with a duct adapted to connect the discharge port with the relief port at a point between the limits of travel of said valve, the latter disposed in the path of said piston for actuation by the latter during its pressure stroke to thereby effect communication between the discharge and relief ports during the pressure stroke of said piston and before the latter has attained the end of its pressure stroke.

IRVING COWLES.